United States Patent [19]
Sundin et al.

[11] 3,915,859
[45] Oct. 28, 1975

[54] APPARATUS FOR REMOVING OIL FROM WATER

[75] Inventors: George H. Sundin, Duluth; Fred H. Riedel, Cloquet; William R. Niemi, Duluth; Robert C. Slocumb, St. Paul, all of Minn.

[73] Assignee: Conwed Corporation, St. Paul, Minn.

[22] Filed: Apr. 11, 1974

[21] Appl. No.: 459,915

[52] U.S. Cl. .............. 210/104; 210/324; 210/401; 210/DIG. 21
[51] Int. Cl.² .......................................... B01D 33/04
[58] Field of Search .......... 210/104, 106, 107, 111, 210/143, 400, 401, 484, 489–491, DIG. 21, DIG. 5, 97, 324

[56] References Cited
UNITED STATES PATENTS

| | | | |
|---|---|---|---|
| 2,675,129 | 4/1954 | Doubleday | 210/106 |
| 3,048,275 | 8/1962 | Headrick | 210/DIG. 5 |
| 3,208,596 | 9/1963 | Gravert | 210/DIG. 5 |
| 3,358,834 | 12/1967 | El-Hindi | 210/401 X |
| 3,618,772 | 11/1971 | Dietrick | 210/104 |
| 3,630,891 | 12/1971 | Peterson | 210/DIG. 21 |

*Primary Examiner*—John Adee
*Attorney, Agent, or Firm*—Eyre, Mann & Lucas

[57] ABSTRACT

An apparatus for the removal of oil from water is disclosed. The apparatus comprises a moving belt which selectively absorbs oil and passes water. Automatic means are employed for advancing the belt when it is saturated with oil.

15 Claims, 6 Drawing Figures

CLEAN H₂O

APPARATUS FOR REMOVING OIL FROM WATER

The present invention relates to an apparatus for separating two immiscible liquids and preferably for removing oil from an oil-water mixture. When the term "oil-water mixture" is used it will be understood that the term includes emulsions, dispersions, etc.

The problem of separating oil from water is one which is difficult but yet very necessary in these days of environmental awareness. There are, of course, many known processes and apparatuses for the removal of oil from water. Typical of these are the centrifugal separators in which the oil and water are separately positioned by centrifugal force because of their varying densities and are then separated from each other by decantation. Other known processes include mechanical coalescers, those which absorb oil from water with a selective material such as a plastic foam (see for example U.S. Pat. No. 3,520,806) or with a cellulose fiber mat (see for example U.S. Pat. No. 3,630,891).

The prior art processes which are known are reasonably good for removing large quantities of oil from water. Their failing is that they do not get the water as pure as it should be. For example, with centrifugal separators it is difficult to get below 100 p.p.m. oil even using the most sophisticated equipment. With the mat type products it is difficult to get down even to this level.

In accordance with the present invention there is provided an apparatus for separating oil from water and for getting the oil level down to 10 p.p.m. or even less. Furthermore, the apparatus of the present invention provides a continuous means for separating oil from water thereby enabling it to be used advantageously even for separation of large quantities of oil from water.

These and other features of the instant invention may be more fully undestood with respect to the drawings wherein.

Figure 1:
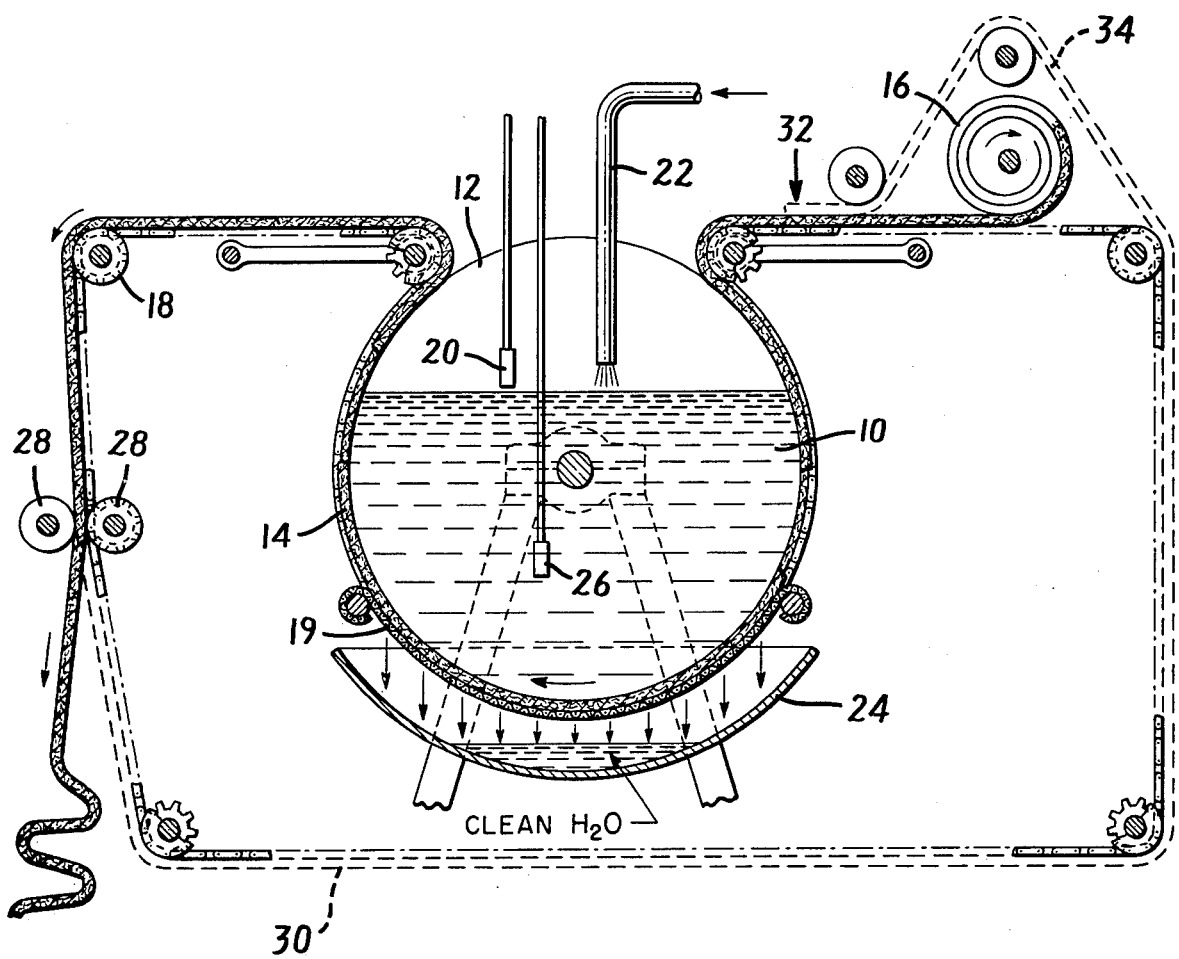
FIG. 1 shows a preferred embodiment of the present invention.

In FIG. 1 an oil-water mixture 10 is enclosed within a spool 12. The spool preferably comprises two end discs and a central arbor but it may be perforated drum or the like if desired. Wrapped about the spool is a sheet of selectively absorbent material 14.

The selectively absorbent material 14 may be a cellulose fiber mat, plastic foam mat or the like, depending on application. The essential features of this material are that it must be capable of passing one of the liquids, it must be capable of retaining the other liquid, it must be flexible enough to pass around the spool 12 and yet it must have sufficient structural integrity so as not to tear or hydraulically erode in operation. It will of course be understood that the structural integrity referred to could be in part supplied by a reinforcing member or by a reinforcing support along which the absorbent material travels. Suitable for this purpose are the cellulose fiber mats disclosed in U.S. Pat. No. 3,630,891. These mats comprise a wood fiber held together with a water resistant binder such as a phenolic and are usually reinforced with a plastic net to give additional tensile strength. In most of the cases of the illustrated patent, a wax coating is employed so that the mat will repel water and float which is generally its intended application. In accordance with the present invention it is preferable to reduce the amount of wax or other sizing used with the cellulose fiber mats since this will permit the water to permeate more freely through the material. It will be understood that while specific reference is made to the fiber mat of U.S. Pat. No. 3,360,891 there are many other materials which are suitable for use in the present invention, as for example polyurethane foam, ethylene propylene diene foam and the like.

Oil absorbent material 14 is contained on a supply roll 16 and is advanced over the spool by driven shaft 18. The spool is preferably rotated at the same rate that the selectively absorbent material is advanced so that there is no undue friction between the two. The oil absorbent material as it passes around spool 12 may be supported as for example by a wire screen 19 on its bottom side if desired. This wire screen can either be fixed in place or can be continuous and move with the sheet of absorbent material. It will also be understood that while only a single supply roll is shown, a plurality of supply rolls could be employed to supply a plurality of layers of absorbent material, either of the same or of different composition.

Supply pipe 22 introduces the oil-water mixture to the spool 12, and a sensor 20 is provided for determining the level of the oil-water mixture 10.

In operation, the oil-water mixture will be introduced to the spool 12 and water will pass through the absorbent material 14 whereafter it will be collected in collecting trough 24. The oil which is in the water will be absorbed by the oil absorbent material 14. As the oil absorbent material becomes more saturated with oil, it will become less easily penetrable by the water (because its air spaces will tend to fill up) and the oil-water level in the spool will increase. When the oil-water level reaches the high level sensor, the sensor will be activated and will send a signal to the driven shaft telling it to advance the oil absorbing sheet. As the sheet of oil absorbent material is advanced, the water will start to flow more rapidly through the fresh oil absorbent material and this will reduce the oil-water level in the spool. When the oil-water level again falls below the level of the sensor, the driven shaft will no longer be signaled to operate until such time as the oil absorbent material shall again become oil laden and the oil-water mixture shall again rise to the level of the sensor. Suitable sensors for the purpose of the present invention are well within the skill of the art. If desired, a float type sensor could be employed. This would preferably be employed in a column where it would trip an "on" switch as it rose to a certain point and then it would trip a second lower located switch to the "off" position when it dropped to that point. Alternatively, a solid state control having upper and lower "on" and "off" positions respectively could be employed.

While the automatic sensor switch is preferred, there are other ways of automatically advancing the sheet of oil absorbent material. For example, the driven roll could be driven at a constant speed thus advancing the oil absorbent material at a constant rate. This is especially applicable where the quantity of oil in the oil-water mixture remains substantially constant and thus the rate of advance of the oil absorbent material can be constant. The constant driven roll should preferably be rheostat or similarly controlled so that the constant speed can be set based on the amount of oil in the water, the amount of oil removal desired, etc.

No matter what type of advance is employed, the strength of the absorbent material must be kept in mind in determining the height to which the oil-water level will be permitted to rise. It is, of course, not desirable to permit the liquid level to rise to such a height that it wll put undue strain on the absorbent material which might make it break or at least deleteriously space from the discs of the spool.

In addition to the automatic means for advancing the driven shaft, there could also be employed a lower level sensor 26 which could increase the flow of oil-water solution through the pipe 22 should the oil-water level begin to fall that low.

After the oil laden absorbent material passes over the driven shaft, it may suitably be passed through squeeze rolls 28 whereby the absorbed oil may be squeezed out and recovered. Thereafter, the used absorbent material may either be discarded or may be recycled along line 30 as shown back to starting point 32 where it can be employed as a second (or third, etc.) layer of absorbent material. It will be appreciated by those skilled in the art that if the recycled layer is made the top layer by following the path 34 this facilitates use of the absorbent material in two cycles whereafter it can conveniently be discarded.

Figure 2:
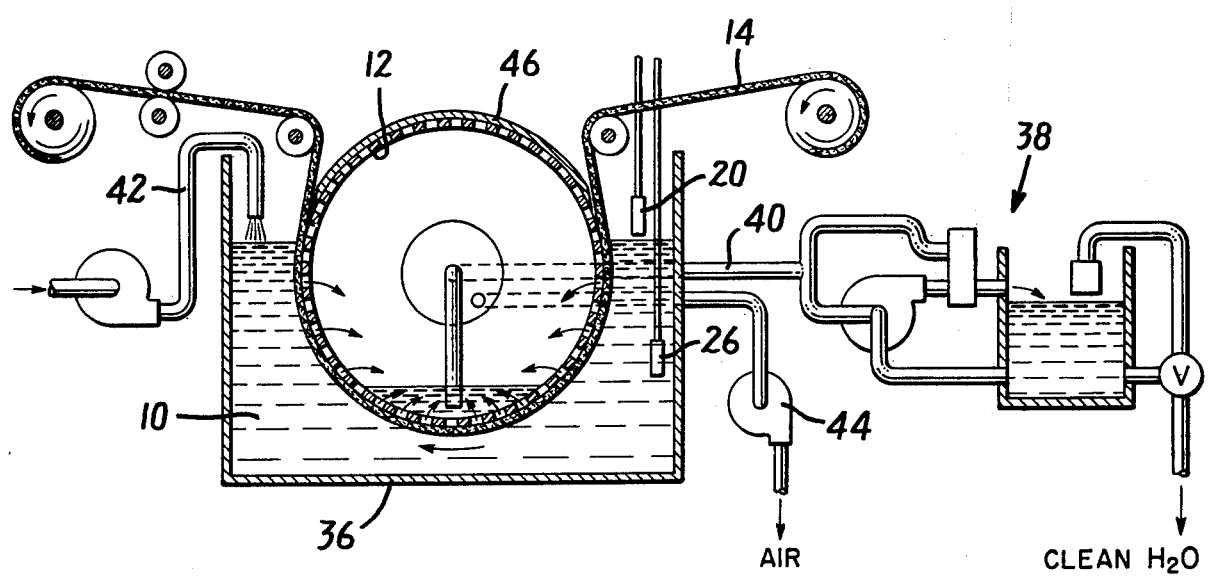
FIG. 2 shows an alternate embodiment of the present invention.

In FIG. 2 there is shown an alternate embodiment of the device of FIG. 1. In this case, the oil-water mixture 10 is contained in a vessel 36 which has a rotating drum or spool 12 in its center. An oil absorbent material 14 passes about the drum in much the same manner as in FIG. 1 and it will be appreciated that this oil absorbent material can be used in much the same manner as in FIG. 1, including for example squeezing out and recycling. The water from the oil-water mixture will pass through the oil absorbent material and into the perforated drum from which it is removed suitably by means of an aspirator 38 through tube 40. The oil-water mixture is introduced through pipe 42. Sensors 20 and 26 may be employed as they were in FIG. 1 and more specifically sensor 20 can be employed to control the advance rate of absorbent material 14.

If desired, vacuum pump 44 can be employed for creating a vacuum in the interior of the drum 12 thereby facilitating passage of the water into the drum. This vacuum could also be created using the aspiration vacuum pump. Where such a vacuum is used, there should also be employed a nonperforated covering shield 46 as shown.

Figure 3:
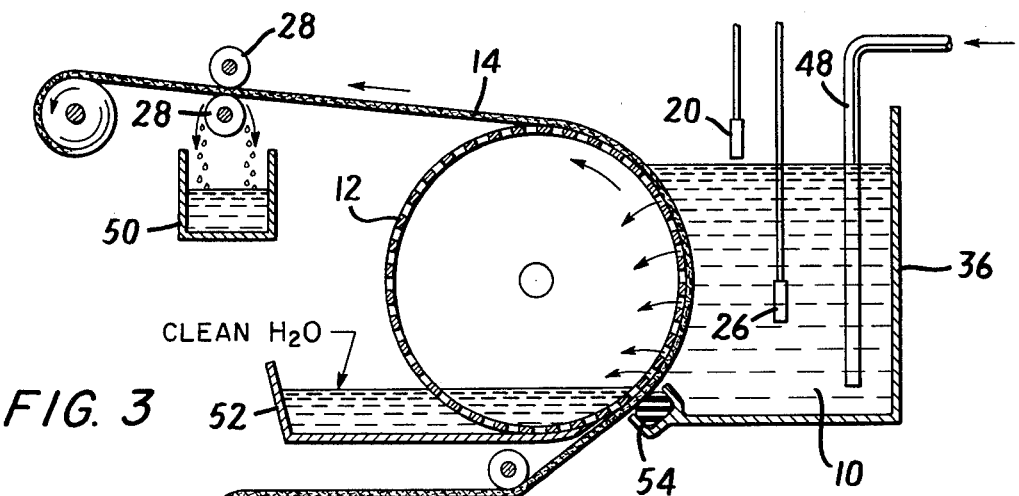
FIG. 3 shows yet another embodiment of the present invention.

In the embodiment of FIG. 3, the spool or perforated drum 12 is used as a side of the tank 36 which holds the oil-water mixture 10 introduced through pipe 48. The absorbent material 14 is fed across the drum after which it goes to squeeze rolls 28 where oil can be removed and collected in container 50. The water which passes into the drum can suitably be collected by means of member 52. As shown, an end seal 54 is provided to make a substantially water tight seal between the drum, the oil absorbent material, and the edge of the container 36. As with FIGS. 1 and 2, sensors 20 and 26 can be employed, especially sensor 20 for controlling the feed rate of the oil absorbent material.

Figure 4:
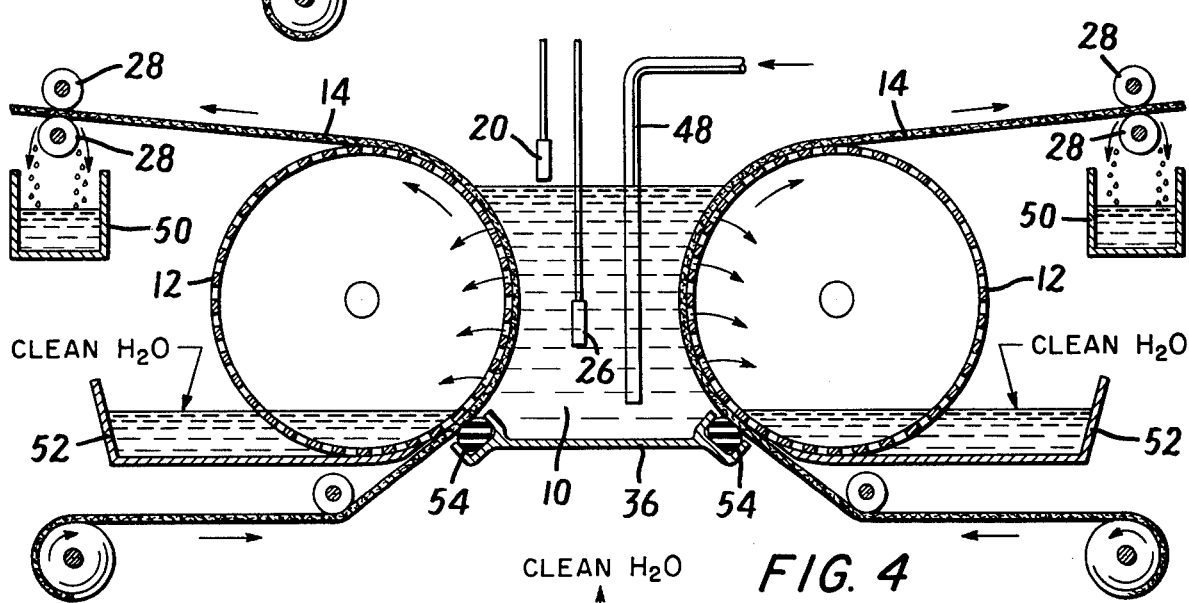
FIG. 4 shows an alternate embodiment of that shown in FIG. 3.

FIG. 4 shows an alternate embodiment of FIG. 3 in which one drum 12 is employed as each side of the tank 36 for the oil-water mixture 10. In all other respects apparatus is similar to FIG. 3.

Figure 5:
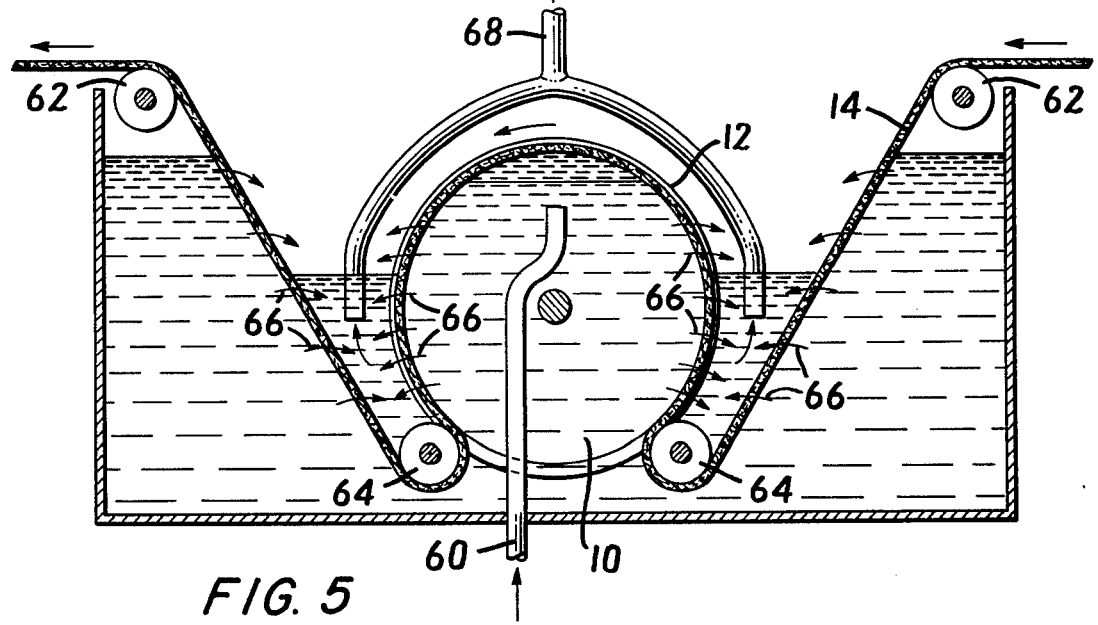
FIG. 5 shows another alternative embodiment of the present invention.

In FIG. 5 is shown another embodiment of the apparatus according to the present invention. In this case the oil-water mixture 10 is introduced to the spool or drum 12 through a bottom inlet 60. The absorbent material 14 is passed over rollers 62 and 64 whereby it is brought about spool 12. The water from the water-oil mixture passes through the selectively absorbent material 14 in the direction of the arrows 66. The water is then removed by means of Y-shaped tube 68 by suction or the like.

Figure 6:
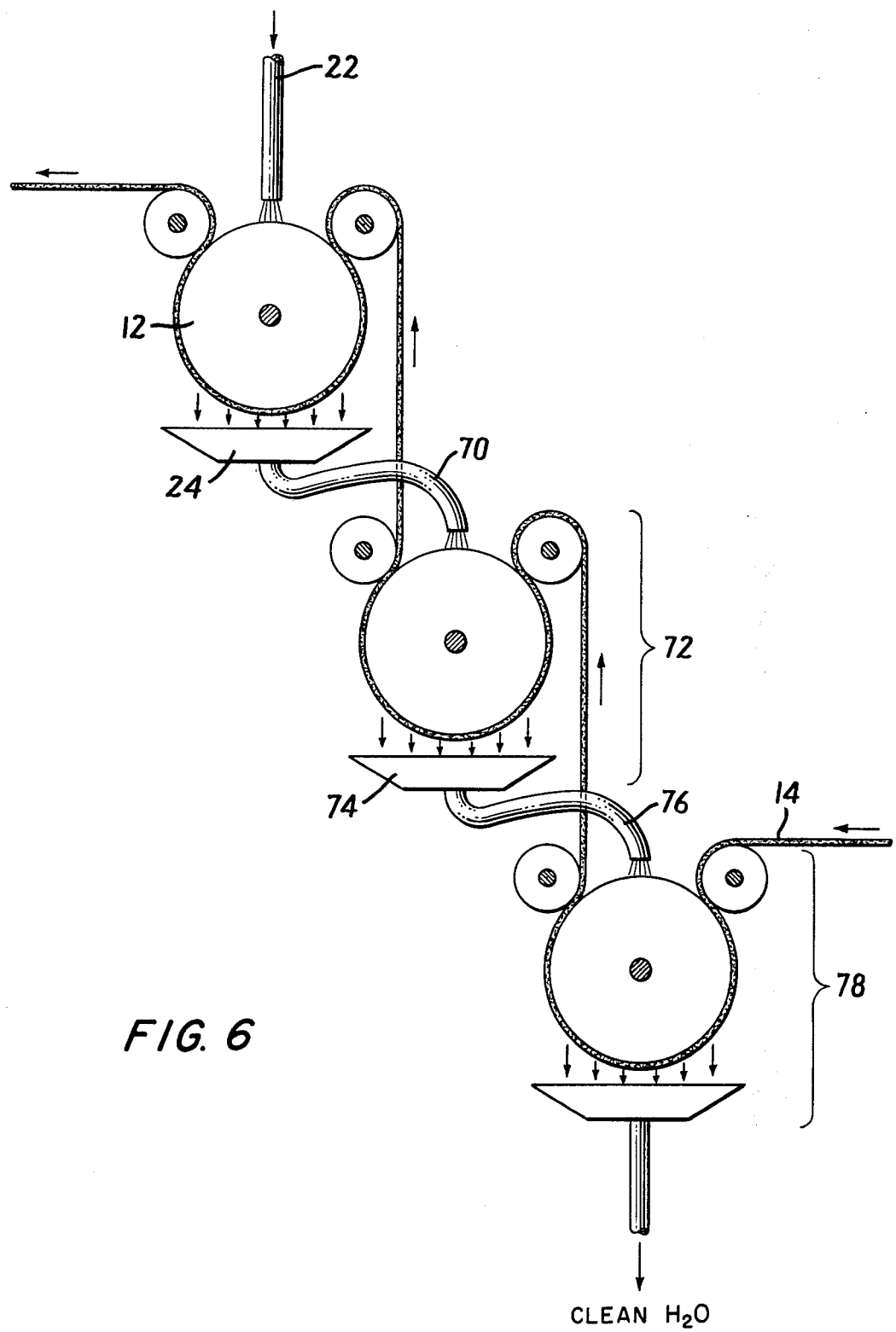
FIG. 6 shows the embodiment of FIG. 1 in cascading relationship.

In FIG. 6 is shown a cascading arrangement of the embodiment of FIG. 1. Once cleaned water collected in collecting trough 24 passes through tube 70 into a second cleaning operation 72 and thence from water collecting trough 24 of second cleaning operation 72 through a tube 76 into a third cleaning operation 78. It will be understood that as many or as few successive cleaning operations may be used as desired. It will be noted that the selectively absorbent material 14 is introduced in its clean state at the last cleaning stage and is used in its dirtier stages in the initial cleaning stages. Means for removing oil from the selectively absorbent material can be provided between each successive stage, if desired.

It will be understood that many of the variations shown in one of the illustrated embodiments is applicable also to the other embodiments. For example, vacuum to create greater deferential pressure and hence provide greater flow capacity could be used with the embodiments of FIGS. 1, 3 or 4 as well as with FIG. 2 as shown although it would be considerably more difficult to employ vacuum with the other embodiments. It is also pointed out that vacuum is not usually considered necessary in the present invention. Similarly, the cascade technique of FIG. 6 could be used with the other embodiments if desired.

The mixture of two immiscible liquids which will be introduced to the drum can have any ratio of one liquid to the other but it has been found that the present invention is most efficient when the liquid to be absorbed by the selectively absorbent material is 2% or less of the total mixture. The apparatus of the present invention has been found to be especially useful when the oil content is 500 p.p.m. or less.

While reference herein has been made to mixtures of two immiscible liquids, it will be understood that a mixture could contain more than two and that the apparatus of the present invention could be employed to separate them by appropriate selection of selectively absorbent materials.

It will be understood that the claims are intended to cover all changes and modifications of the preferred embodiments of the invention, herein chosen for the purpose of illustration, which do not constitute departure from the spirit and scope of the invention.

What is claimed is:

1. Apparatus for separating a liquid from a liquid mixture comprising at least two immiscible liquids comprising:

a. containing means for containing the liquid mixture;
b. receiving means for receiving the balance of the mixture after the liquid to be removed has been separated therefrom;
c. a sheet of selectively absorbent material positioned between the liquid mixture and the receiving means;
d. said selectively absorbent material being capable of absorbing the liquid to be removed and being capable of passing the balance of the mixture;
e. supply means for supplying said sheet of selectively absorbent material;
f. advancing means for advancing said sheet of selectively absorbent material;
g. automatic means for controlling the rate of advance of said advancing means, said automatic means including:
  i. at least one driven roll for advancing the selectively absorbent material;
  ii. at least one sensor for detecting the level of liquid mixture in the containing means; and
  iii. said driven roll being operative in response to a signal from said sensor
  iv. whereby the sheet of selectively absorbent material is advanced.

2. The apparatus of claim 1 further comprising means for removing the absorbed liquid from the selectively absorbent material.

3. The apparatus of claim 2 further comprising means for recycling the selectively absorbent material.

4. The apparatus of claim 1 wherein the automatic means is responsive to the level of liquid mixture in the containing means.

5. The apparatus of claim 1 further comprising means for automatically introducing liquid mixture to the containing means.

6. The apparatus of claim 1 wherein vacuum is used in conjunction with the receiving means.

7. Apparatus for separating oil from an oil-water mixture comprising:
a. containing means for containing the oil-water mixture;
b. receiving means for receiving the water after the oil has been separated therefrom;
c. a sheet of oil absorbent material positioned between the oil-water mixture and the receiving means;
d. said oil absorbent material being capable of absorbing oil and being capable of passing water;
e. supply means for supplying said sheet of oil absorbent material;
f. advancing means for advancing said sheet of oil absorbent material;
g. automatic means for controlling the rate of advance of said advancing means, said automatic means including:
  i. at least one driven roll for advancing the oil absorbent material;
  ii. at least one sensor for detecting the level of oil-water mixture in the containing means; and
  iii. said driven roll being operative in response to a signal from said sensor
  iv. whereby the sheet of oil absorbent material is advanced.

8. The apparatus of claim 7 further comprising means for removing oil from the oil absorbent material.

9. The apparatus of claim 8 further comprising means for recycling the oil absorbent material.

10. The apparatus of claim 7 wherein the automatic means is responsive to the level of the oil-water mixture.

11. The apparatus of claim 7 further comprising means for automatically introducing the oil-water mixture to the containing means.

12. The apparatus of claim 7 wherein vacuum is used in conjunction with the receiving means.

13. The apparatus of claim 7 wherein the oil absorbent material comprises a felted fibrous sheet of porous vegetable fibers.

14. The apparatus of claim 13 wherein the felted fibrous sheet is reinforced with a plastic net.

15. Apparatus for separating a liquid from a liquid mixture comprising at least two immiscible liquids comprising:
a. containing means for containing the liquid mixture;
b. receiving means for receiving the balance of the mixture after the liquid to be removed has been separated therefrom;
c. a sheet of selectively absorbent material positioned between the liquid mixture and the receiving means;
d. said selectively absorbent material being capable of absorbing the liquid to be removed and being capable of passing the balance of the mixture;
e. supply means for supplying said sheet of selectively absorbent material;
f. advancing means for advancing said sheet of selectively absorbent material;
g. automatic means for controlling the rate of advance of said advancing means; and
h. means for recycling the selectively absorbent material, the recycled selectively absorbent material being positioned between the sheet of selectively absorbent material and the liquid mixture.

* * * * *